Aug. 2, 1932.　　　A. S. GOFORTH　　　1,870,109
SERVICE TRAY
Filed Nov. 9, 1931
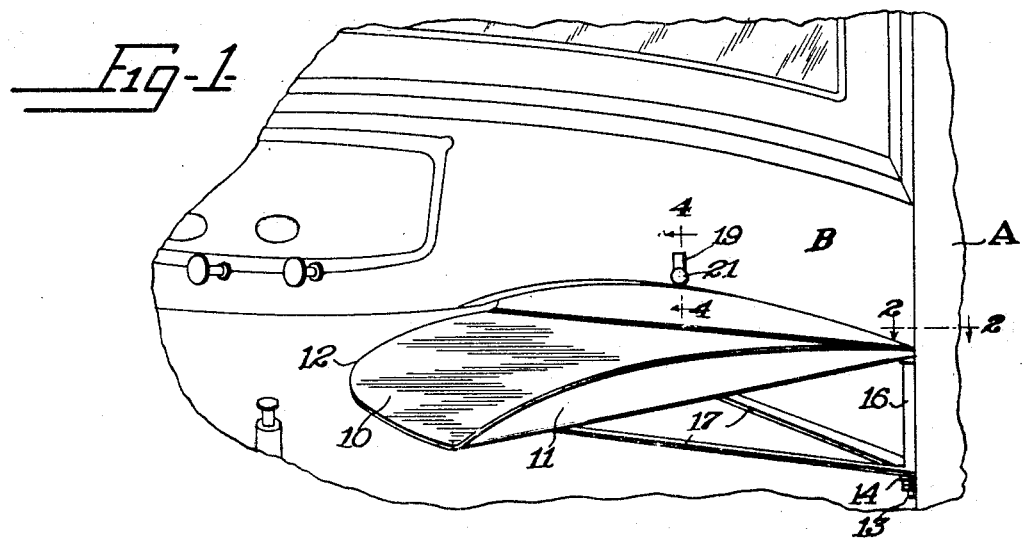
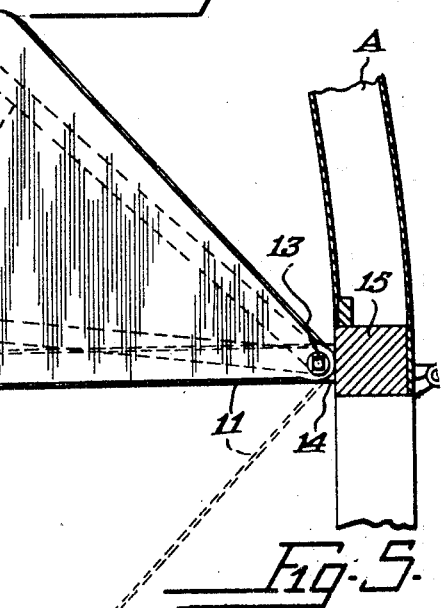
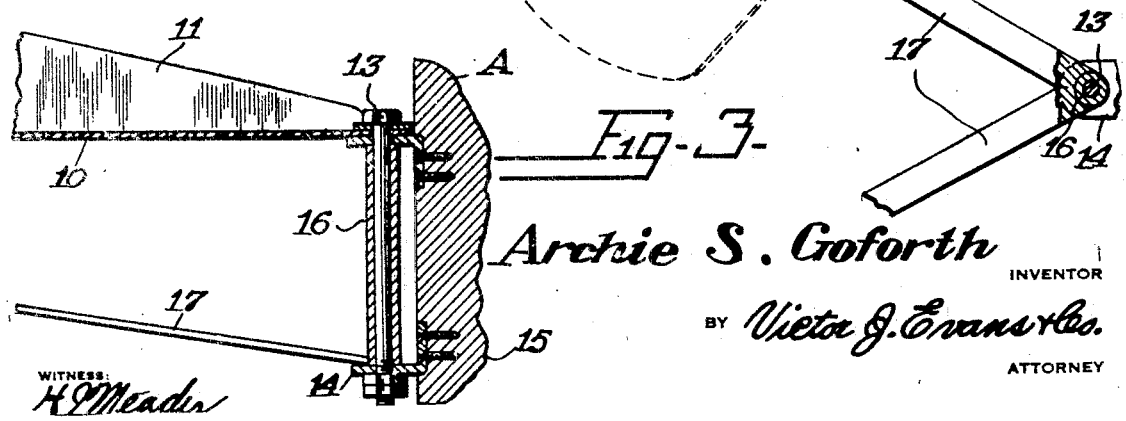
Archie S. Goforth
INVENTOR
BY *Victor J. Evans & Co.*
ATTORNEY
WITNESS:
H. Meader Patented Aug. 2, 1932

1,870,109

UNITED STATES PATENT OFFICE

ARCHIE S. GOFORTH, OF DECATUR, ALABAMA

SERVICE TRAY

Application filed November 9, 1931. Serial No. 573,965.

The invention relates to a service tray and more especially to an automobile serving tray.

The primary object of the invention is the provision of a tray of this character wherein the same is swingingly supported within the body of an automobile at the dash or instrument board so that the same can be shifted into position for service and when not to be used can be swung to a position out of the way and to one side of the dash or instrument board of the automobile.

Another object of the invention is the provision of a tray of this character wherein the same in its mounting can be latched when, in serving position, the tray and the mounting thereof being novel in form.

A further object of the invention is the provision of a tray of this character which is extremely simple in construction, thoroughly reliable and efficient for its purpose, strong, yet light of weight, durable, neat and attractive in appearance, readily and easily adjusted, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:—

Figure 1 is a fragmentary perspective view of a portion of an automobile body and its dash or instrument board showing the tray constructed in accordance with the invention in serving position.

Figure 2 is a sectional view on the line 2—2 of Figure 1 looking in the direction of the arrows.

Figure 3 is a vertical sectional view through the tray and its support.

Figure 4 is a sectional view on the line 4—4 of Figure 1 looking in the direction of the arrows.

Figure 5 is a fragmentary detail plan view of a portion of the support for the tray, the same being partly broken away.

Similar reference characters indicate corresponding parts throughout the several views in the drawing.

Referring to the drawing in detail, A designates generally a portion of the body of an automobile and B the dash or instrument board which is of conventional form and within this body is mounted the tray constituting the present invention and hereinafter fully described.

The tray comprises a substantially sector-shaped body 10 preferably made from sheet metal having the converging upturned substantially arch-shaped end flanges 11 and a rounded wide edge 12, while the opposite narrow end of said body is suitably perforated to accommodate a vertical pivot bolt 13, the latter being mounted in spaced angle brackets 14, these being vertically disposed and made fast in their spaced relation to the vertical studding 15 of the frame of the automobile body A immediately beneath the dash or instrument board B thereof as is clearly shown in Figures 1 and 2 of the drawing while arranged between the angle brackets 14 is a sleeve 16 accommodating the pivot bolt 13 and this sleeve at its lower end has formed therewith a pair of braces 17 which are extended in outwardly diverging relation to each other to engage the underside of the body 10 constituting the tray proper, the braces 17 being inclined from the latter to the sleeve 16, thus it being apparent that the said body can be swung horizontally in an arcuate path so as to protrude from one side or the other of the dash or instrument board B, the end flanges 11 being adapted to abut the said dash or instrument board B to limit the swing of said body 10 on manual shifting thereof, as the said end flanges 11 rise a distance above the lower edge of said dash or instrument board, this being illustrated in Figure 4 of the drawing.

Mounted in the dash or instrument board B is a latching device including the inner and outer keepers 18 and 19 carried upon a turning stem 20 having a narrow knob 21 so that on the turning of said device the keepers 18 and 19 can be swung to a position to latch or unlatch with the flanges 11 of the body 10 and thus in this manner the tray will be held when swung inwardly or outwardly with respect to the dash or instrument board B and when swung outwardly will be in position for service.

What is claimed is:—

A tray of the kind described comprising a substantially sector-shaped body, a swinging bracket adapted for mounting within an automobile body immediately beneath its instrument board and carrying said sector-shaped body, flanges upturned from the longer edges of the sector-shaped body and coacting with the instrument board to limit the swing of said body, and means on the instrument board for latching engagement with the flanges to hold the sector-shaped body at the limits of its movements.

In testimony whereof I affix my signature.

ARCHIE S. GOFORTH.